June 7, 1932.   L. A. PARADISE ET AL   1,862,159
GRAIN STORAGE TANK FOR THRESHERS
Original Filed May 9, 1928   2 Sheets-Sheet 2
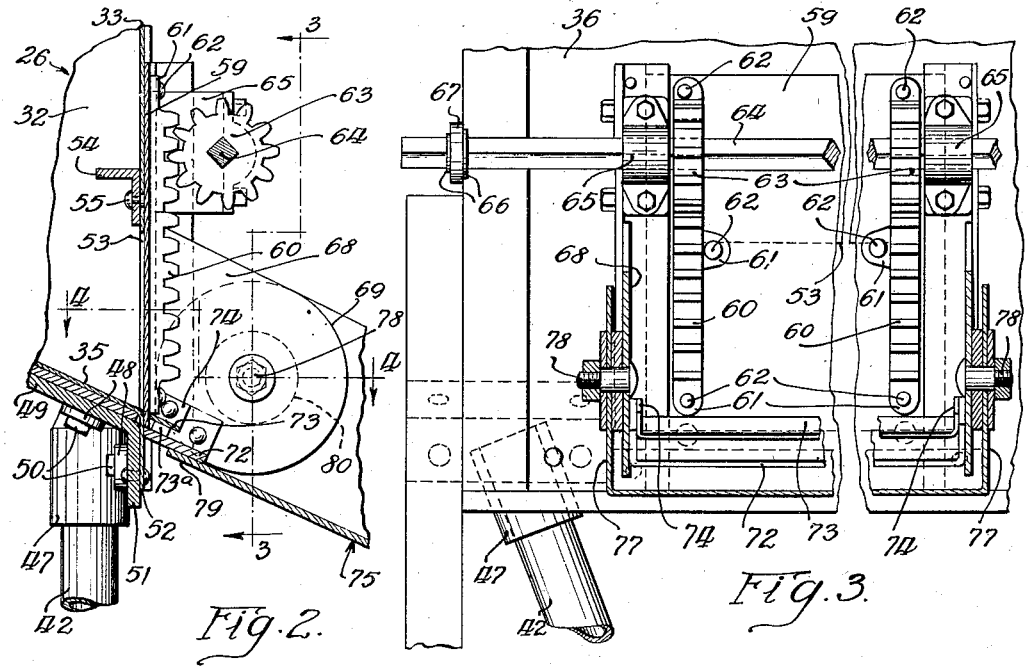
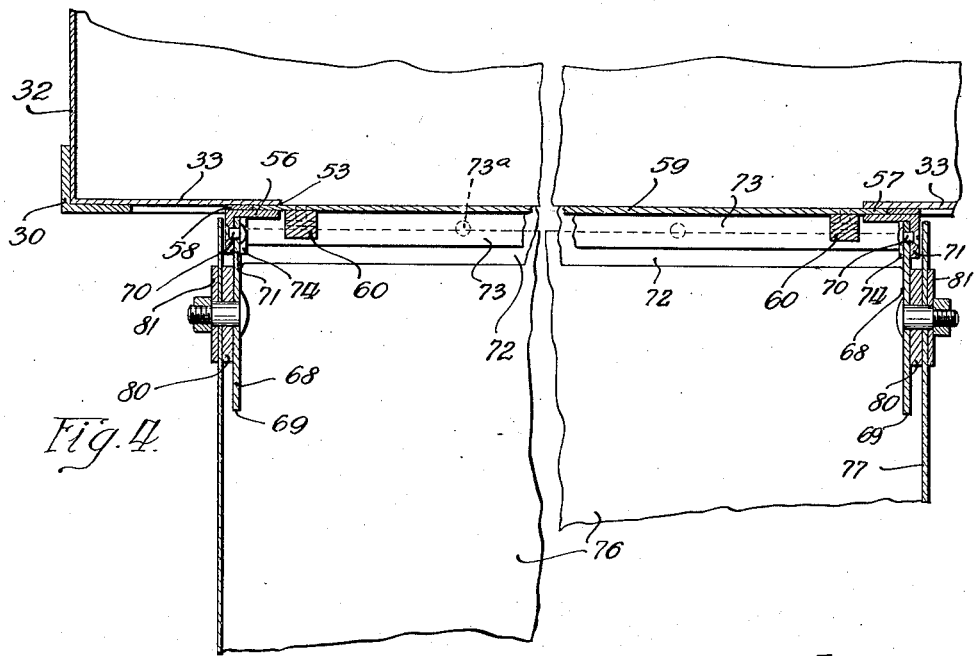
Inventors.
Louis A. Paradise
Edwin Frederick Huddle.
By Brown, Jackson, Boettcher & Dienner
Attys.

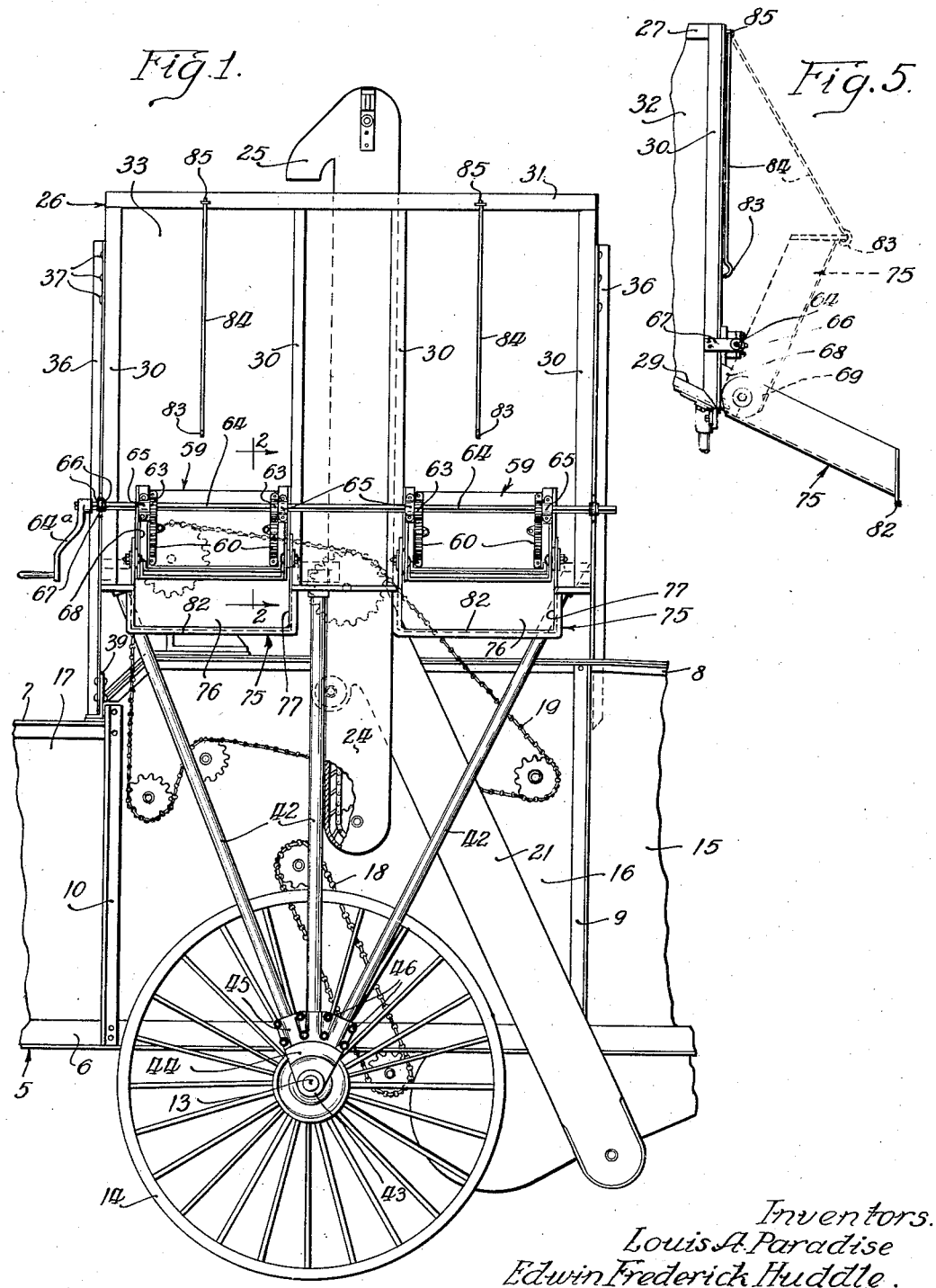

Patented June 7, 1932

1,862,159

UNITED STATES PATENT OFFICE

LOUIS A. PARADISE AND EDWIN FREDERICK HUDDLE, OF MOLINE, ILLINOIS, ASSIGNORS TO DEERE & COMPANY, OF MOLINE, ILLINOIS, A CORPORATION OF ILLINOIS

GRAIN STORAGE TANK FOR THRESHERS

Original application filed May 9, 1928, Serial No. 276,238. Divided and this application filed July 31, 1929. Serial No. 382,342.

Our invention relates generally to grain harvesters, and more particularly to that type of harvester and thresher known as a combine. In a combine the grain is cut, threshed and cleaned as a continuous operation while the implement is in motion, and the cleaned grain is stored temporarily in a storage tank carried by the implement and from which it is delivered to wagons or other independent receptacles from time to time as required. A portion of such a combine is illustrated and described in our application, Serial No. 276,-238, filed May 9, 1928, of which application this is a division.

The present application is directed to the provision of improved door means for effecting or controlling the discharge of the grain from this grain storage tank on the combine, into a wagon alongside the combine. One of the features of this door means is the operating arrangement thereof whereby the same may be quickly and easily moved between open and closed positions and may be made to assume any intermediate position for graduating the flow of grain, and whereby this door means is prevented from twisting, binding or jamming under the pressure of the grain.

Another feature of the invention is the provision of two or more doors for securing a rapid discharge of the grain from different parts of the storage tank and for effecting a distributed heaping of the grain in the wagon, such doors being operatively connected for simultaneous actuation.

Another object of our invention is the provision of pivoted grain chutes leading from the doors, and cooperating means associated therewith for preventing bulging of the doors under the weight of the grain, and means for preventing leakage of the grain between the doors and the chutes.

In order to acquaint those skilled in the art with the construction and operation of our invention, we have shown in the accompanying drawings a specific illustration embodying the preferred form thereof.

Fig. 1 is an elevational view of the left side of the combine with the end portions thereof broken away;

Fig. 2 is an enlarged fragmentary sectional view, taken on the line 2—2 of Fig. 1;

Fig. 3 is a sectional view, taken on the line 3—3 of Fig. 2;

Fig. 4 is a horizontal section, taken on the line 4—4 of Fig. 2; and

Fig. 5 is a fragmentary view illustrating the chute in operative position in full lines and in inoperative position in dotted lines.

Fig. 1 illustrates only that portion of the combine substantially in the plane of the rear supporting wheels, the grain storage tank being supported over these wheels.

The main frame 5 of the machine comprises horizontally disposed angle bars 6, 7 and 8, bent at points where necessary for connection with vertically extending bars 9 and 10. The angle bars 6 are suitably supported on the rear axle 13 in any appropriate manner, said axle 13 being supported by the rear wheels 14. Suitable threshing and conveying mechanism is housed and supported by the frame, and is substantially enclosed by suitable sheet metal partitions 15, 16 and 17.

The chains 18 and 19 which operate over the various sprockets as shown in Fig. 1 are for driving certain moving parts of the mechanism, and the compartment 21 houses one of the conveyors employed in the operation of the machine. The cleaned grain is forced by a grain auger (not shown) into the lower end of a housing 24, in which is mounted a suitably operated conveyor arranged to discharge grain from the outlet 25 into the storage tank 26.

The storage tank 26 comprises a frame constructed of suitable angle bars 27, 29, 30 and 31, (Figs. 1 and 5), suitably secured together and having the ends 32 and sides 33 composed of sheet metal members, as shown in Fig. 4. The bottom of the tank is indicated at 35, see Fig. 2. Supporting bars 36 are secured by bolts or rivets 37 to the bars of the tank frame at the far side thereof as viewed in Fig. 1 for supporting that side of the tank. The bars 36 are secured at their lower ends to suitable webs or plates 39 and these plates are suitably secured to the frame cross bars. The near side of the tank, as viewed in Fig. 1, is sustained on tubular supporting bars 42.

The storage tank 26 is shallow at one side and deep at the other side, the bottom plate 35 sloping in the manner shown in Fig. 2, so that grain, as it comes from the outlet 25 located above the deep portion, falls into the deep side of the tank, and by this arrangement it will be noted that nearly the entire weight thereof is carried by the tubular supporting bars 42.

A journal or bearing member 43 is positioned on the outer end of the axle 13 and is provided with an integral upwardly extending flange 44, divided at the upper edge and formed into a plurality of radially disposed split sockets 45, which receive the lower ends of the bars 42 and are held in clamping engagement therewith by means of bolts 46. The bars 42 extend radially from the sockets 45 and are provided with caps 47 arranged to engage on the under side of an angle plate 49, and are, preferably, secured thereto by bolts 50 in the lugs 48, as shown in Fig. 2. The angle plate 49 engages beneath the deep end of the tank, as shown, and the downwardly extending edge 51 is riveted to the downwardly extending portion 52 of the tank bottom plate 35. While the supporting means for the deep side of the tank has been illustrated and described, it has not been claimed herein as it forms the subject matter of the application above mentioned.

The side plate 33 of the tank is cut away adjacent to the lower edge, providing an opening 53, the edge of which is reenforced along the top by an angle bar 54 secured to the inner side of the plate 33 by rivets 55.

Vertically extending angle bars 56 are secured to the side plates 33 of the tank by suitable means, and spaced therefrom by reenforcing bars 58 for providing space for the edge 57 of the door 59 to slide between the bar 56 and the plate 33. There are two vertically sliding doors 59 each having racks 60 on the outer faces thereof and secured thereto by lugs 61 and rivets 62, and the same are arranged to operate vertically by means of pinions 63 mounted on and rotatable by the shaft 64 mounted in the bearings 65. The shaft 64 has additional bearing support and is held against movement in a longitudinal direction by means of collars 66 secured thereto and rotatable in bearings 57 in the manner illustrated. A crank handle 64$^a$ is provided for rotating the shaft 64.

Plates 68, having rounded outer end portions 69, are suitably secured, as by rivets 70, to the outwardly extending flanges 71 of the angle bars 56. A ledge plate 72 engages the downwardly extending flange portion 52 of the bottom plate 35, and the ends of said ledge plate are bent upwardly and are rigidly secured to the plates 68 in a manner to prevent leakage of grain between the opening of the door and the pivotally mounted grain chute. A second ledge plate 73, similar to the plate 72, is mounted above the latter and spaced therefrom by cylindrical spacing blocks 73$^a$. The upwardly bent ends 74 of the plate 73 are secured to the upwardly bent ends of the plate 72, thus rigidly positioning the ledge plate 73 in front of the lower edge of the door 59 and leaving sufficient clearance to allow free sliding of the door, but, at the same time, preventing outward bulging of the lower part of the door when the tank is filled with grain and the door is closed. It will be noted also that by providing spacing members of cylindrical form between the ledge plates 72 and 73, the spacing members will not obstruct passage of the grain between the two ledge plates, so that the space for receiving the lower edge of the door will always remain clear of the grain, thus facilitating closing the door.

Positioned at the lower edge of each door 59 is a grain chute 75 adapted to discharge into a wagon alongside the combine. Each chute comprises a scoop-like member of sheet metal having a relatively wide, flat bottom 76 and vertical sides 77, the rear ends of which are secured to the plates 68, by means of bolts 78, which so position the chute that the rear edge 79 of the bottom portion engages beneath the lower ledge plate 72, which acts as a stop therefor and prevents leakage of grain therebetween. Washers 80 and 81 are positioned on the bolts 78 for suitably spacing the chute 75 from the plates 68 and for permitting pivotal movement relative thereto.

The outer edge of each chute 75 is provided with a reenforcing flange 82, which is arranged to be engaged by a hook member 83 when the chute is swung up in the manner indicated in dotted outline in Fig. 5, which is its inoperative position. The hook 83 is provided with a shank 84, pivotally mounted at 85 for permitting the same to swing into the position shown in dotted outline for holding the chute 75 in its upwardly swung position when not being used.

It will be seen from the above that the two doors are opened and closed simultaneously. It should be noted also that by providing the racks and pinions on opposite sides of each door the doors can be opened and closed easily and quickly with little effort on the part of the operator, and that also by this construction binding of the doors in operation is prevented, as both side edges of the doors are moved at the same time. Also, it is preferable to provide two doors, spaced apart as shown, so that the grain will be discharged from distributed points of the storage tank and so that the discharge can be made rapid if desired.

Attention is also called to the fact that in combines such as that illustrated where the storage tank is carried above the threshing and cleaning housing the grain elevator 24 may be extended up through the bottom of the tank adjacent to the discharge side thereof, the two doors permitting discharge from opposite sides of this elevator. Such arrangement of doors also provides points of discharge from different parts of the tank of sufficient height to clear the side of a wagon bed without necessitating that the tank be raised considerably above the threshing and cleaning housing.

It will be understood by those skilled in the art that the present invention is capable of certain variations and modifications without departing from the spirit of the invention, and we do not wish to be limited to the exact details herein illustrated and described, but desire to avail ourselves of such variations and modifications as come within the scope of the appended claims.

We claim:

1. In combination with a grain thresher having a main frame, of a grain tank positioned vertically above said main frame, a sloping bottom in said tank, a discharge opening in the deep side of said tank, reenforcing members positioned around said opening, a sliding door for said opening, the bottom of said tank extending vertically downward in the plane of the door opening, a ledge plate below and engaging the outer side of said downwardly extending portion, and gear operated means for raising and lowering said door.

2. In combination with a grain thresher having a main frame, of a grain tank positioned vertically above said main frame, a sloping bottom in said tank, a discharge opening in the deep side of said tank, reenforcing members positioned around said opening, a sliding door for said opening, a ledge plate mounted below the lower edge of said door and arranged to be engaged thereby when the door is in closed position, gear operated means for raising and lowering said door, and means mounted on said ledge plate and positioned thereabove for reenforcing said door.

3. In combination with a grain thresher having a main frame, of a grain tank positioned vertically above said main frame, a sloping bottom in said tank, a discharge opening in the deep side of said tank, reenforcing members around said opening, a sliding door for said opening, the bottom of said tank passing through said door opening and extending vertically downward, a ledge plate below and engaging the outer side of said downwardly extending portion, gear operated means for raising and lowering said door, and means mounted on and positioned above said ledge plate for reenforcing the door when in closed position.

4. In combination with a grain thresher having a main frame, of a grain tank positioned vertically above said main frame, a sloping bottom in said tank, a discharge opening in the deep side of said tank, reenforcing members around said opening, a sliding door for said opening, the bottom of said tank passing through said door opening and extending vertically downward, a ledge plate below and engaging the outer side of said downwardly extending portion, means mounting said ledge plate on certain of the reenforcing members, and a chute pivotally supported on said last mentioned means.

5. In combination with a grain thresher having a main frame, of a grain tank positioned vertically above said main frame, a sloping bottom plate in said tank, a discharge opening in the deep side of said tank, reenforcing members around said opening, a sliding door for said opening, the bottom of said tank passing through said door opening, and extending vertically downward, a ledge plate below said opening and engaging the outer side of said downwardly extending portion, means mounting said ledge plate on certain of the reenforcing members, a second ledge plate mounted on the first ledge plate and positioned thereabove for reenforcing said door when in closed position, outwardly extending supporting plates adjacent to said opening, and a grain discharge chute pivoted to said supporting means, the rear end of said chute engaging beneath the lower ledge plate.

6. In combination with a grain thresher having a main frame, of a grain tank positioned vertically above said main frame, a sloping bottom in said tank, the lower side edge of said bottom extending below the side portion of said tank, a discharge opening in the side wall of said tank above the bottom thereof, a door slidable vertically outside of the side wall of said tank and adapted to close said discharge opening, a ledge plate extending below the door opening and engaging the bottom plate, a second ledge plate mounted on said first mentioned ledge plate for reenforcing the lower edge of said door when the door is closed, and means for raising and lowering said door.

7. In combination with a grain thresher having a main frame, of a grain tank positioned vertically above said main frame, a sloping bottom in said tank, a discharge opening in the deep side of said tank, a vertically slidable door for closing said opening, means for opening and closing said door, an angle bar secured to the wall of said tank and spaced therefrom at opposite sides of said opening whereby the wall of said tank and said angle bars provide parallel guides for said door, and a plate extending outwardly from each of said angle bars and adapted to pivotally support a discharge chute.

8. In combination with a grain thresher having a main frame, of a grain tank positioned vertically above said main frame, a sloping bottom in said tank, the lower side edge of said bottom extending below the side portion of said tank, a discharge opening in the side wall of said tank above the bottom thereof, a door slidable vertically outside of the side wall of said tank and adapted to close said discharge opening, a ledge plate extending below the door opening and engaging the bottom plate, a second ledge plate mounted on said first mentioned ledge plate and in spaced relation thereto for reenforcing the lower edge of said door when the door is closed, and means for raising and lowering said door.

9. In combination with a grain thresher having a main frame, of a grain tank positioned vertically above said main frame, a sloping bottom in said tank, the lower side edge of said bottom extending below the side portion of said tank, a discharge opening in the side wall of said tank above the bottom thereof, a door slidable vertically outside of the side wall of said tank and adapted to close said discharge opening, a ledge plate extending below the door opening and engaging the bottom plate, spacing members mounted on said ledge plate, a second ledge plate mounted on said spacing members for reenforcing the lower edge of said door when the door is closed, and means for raising and lowering said door.

10. In combination with a grain thresher having a main frame, of a grain tank positioned vertically above said main frame, a sloping bottom in said tank, the lower side edge of said bottom extending below the side portion of said tank, a discharge opening in the side wall of said tank above the bottom thereof, a door slidable vertically outside of the side wall of said tank and adapted to close said discharge opening, a ledge plate extending below the door opening and engaging the bottom plate, cylindrical spacing members mounted on said ledge plate, a second ledge plate mounted on said spacing members for reenforcing the lower edge of said door when the door is closed, and means for raising and lowering said door.

11. The combination with a grain thresher having a main frame, of a grain tank positioned above said main frame, discharge means for said tank comprising a vertically slidable door, guide means receiving the sides of said slidable door, and means mounted on the tank and positioned between said guide means for contacting with the lower edge of said door and holding the same against outward bulging between the sides of the door when the door is in closed position.

In witness whereof, we hereunto subscribe our names this 26th day of July, 1929.

LOUIS A. PARADISE.
EDWIN FREDERICK HUDDLE.